United States Patent [19]

Bradley et al.

[11] Patent Number: 4,816,929
[45] Date of Patent: Mar. 28, 1989

[54] DUAL ACCESS FRAME STORE FOR FIELD OR FRAME PLAYBACK IN A VIDEO DISK PLAYER

[75] Inventors: John J. Bradley, Rochester; Richard C. Painton, Webster; John J. Acello, East Rochester; Edward G. Sawyer, Rochester; Thomas C. Nutting, Fairport, all of N.Y.

[73] Assignee: Eastman Kodak Company, Rochester, N.Y.

[21] Appl. No.: 802,919

[22] Filed: Nov. 29, 1985

[51] Int. Cl.⁴ .............................................. H04N 5/78
[52] U.S. Cl. .................................. 360/10.1; 360/35.1; 358/312
[58] Field of Search ..................... 360/10.1, 35.1, 72.2, 360/9.1; 358/312, 342; 364/518

[56] References Cited

U.S. PATENT DOCUMENTS

| | | | |
|---|---|---|---|
| 3,987,484 | 10/1976 | Bosche et al. | 360/72.2 X |
| 4,058,840 | 11/1977 | Kasprzak | 360/10.1 |
| 4,133,009 | 1/1979 | Kittler et al. | 360/11.1 |
| 4,139,901 | 2/1979 | Ganske et al. | 364/900 |
| 4,161,753 | 7/1979 | Bailey et al. | 358/342 X |
| 4,361,849 | 11/1982 | Bolger | 358/312 |
| 4,449,198 | 5/1984 | Kroon et al. | 358/342 X |
| 4,477,843 | 10/1984 | Kinjo et al. | 360/10.1 X |
| 4,574,395 | 3/1986 | Kato | 364/518 X |

FOREIGN PATENT DOCUMENTS 2103410 2/1983 United Kingdom ............... 360/10.1

OTHER PUBLICATIONS

"Interactive Videodisc Systems for Education"; Bennion et al; SMPTE Journal, vol. 84, Dec. 75, pp. 949-953/360/10.1.

Primary Examiner—Aristotelis M. Psitos
Attorney, Agent, or Firm—David M. Woods

[57] ABSTRACT

A video player, specially adapted to accommodate "mixed field and frame" recordings, incorporates a frame store for playing back still pictures recorded on a magnetic disk as either single field or dual field (full frame) video signals. A repetitive, interlaced output signal is taken from the frame store either directly or through an interpolation circuit. While interpolation benefits single field playback, it is particularly useful for incrementally achieving full frame playback: An interpolated frame is provided for displaying a single field recording and for displaying a still picture before—and until—the second frame of a full frame recording is fully available from the frame store. Once both fields of the picture are stored in the frame store, then and only then is the disk drive motor turned off, albeit that an interpolated frame is displayed before this occurs.

10 Claims, 3 Drawing Sheets

DUAL ACCESS FRAME STORE FOR FIELD OR FRAME PLAYBACK IN A VIDEO DISK PLAYER

BACKGROUND OF THE INVENTION

1. Field of the Invention

This invention relates to a video player of the type that produces a video output signal representative of a sequence of still pictures recorded on a magnetic disk.

2. Description Relative to the Prior Art

A still video recording format has been proposed in which a small, flexible magnetic disk is used to store up to 50 still video pictures. The still video pictures originate with an electronic camera or by transfer from another media (e.g., photographic film). The recording format provides the option of storing a full frame (two circular tracks per picture) for 25 pictures, or a single field (one circular track per picture) for 50 pictures. Which option is selected for a given disk (or a given track on the disk) is indicated by a data signal that is recorded with each video picture.

The pictures are played back by inserting the recorded disk into a video disk player, which converts the video signals recorded on the disk into a suitable format (e.g., NTSC) television signal. If the player is assured of receiving only single field recordings, it can take the form of the single head machine disclosed in U.S. Pat. No. 4,470,076. Though only one field is recorded, it still is desirable to generate a full frame (two field) output signal for conventional display circuits. In this patent, the second (interlace) field is interpolated from successive lines of the first (recorded) field. Since, however, the proposed recording format accommodates a full frame as well as a single field, it is desirable to provide two playback heads intimately spaced for sensing the field signals on two adjacent circular tracks. With a proposed track pitch of 0.1mm, mounting two heads so closely complicates mechanical assembly and encourages electrical problems such as crosstalk. To avoid such problems, U.S. Pat. No. 4,481,543 proposes dithering—on a field-by-field basis—a single head between adjacent tracks in order to provide a sequence of alternating field signals. This solution, however, introduces its own mechanical problems, since the head must be shifted between tracks during the vertical blanking period with time to settle before beginning playback of the recorded video signal.

Adding to these problems, the contemplated use of either a single or dual head can lead to significant track wear. Continued passage of the head over the same track applies enough stress and wear to the magnetic coating to eventually change its magnetic properties and thereby reduce signal output (at worst, the head can scrape the magnetic coating from the track).

An intermediate storage device, such as a field or frame store, can be used as a source for display in lieu of the signals recorded on a magnetic disk and, resultantly, in lieu of continued passage of the head(s) over the same tracks(s). In U.S. Pat. No. 4,451,857, a series of field stores are used to accumulate a four-field rendition of a still picture from a magnetic disk at non-video rates. With the field stores acting as time base buffers, readout is provided from them at video rates. In addition, field or frame stores open up a variety of other processing capabilities (see U.S. Pat. Nos. 4,302,776; 4,163,249; 4,148,070; and British Pat. No. 2,029,665).

SUMMARY OF THE INVENTION

To make a frame store of practical use in a video still player, it should be adapted to the special environment of mixed field and frame recording. Accordingly, a player has been designed, and a method operative therewith, using a frame store that is responsive to the character of the recorded signal, that is, whether it represents a single field or dual fields. A single playback head is positioned to acquire either a single picture field from a single track or, with suitable movement, dual picture fields from adjacent tracks. One or both fields, as the case may be, are stored in the frame store. Mixed field and frame recording is handled by specifying two access modes for the frame store: a first mode in which a single picture field signal is repeatedly recovered and a second mode in which two field signals are alternately recovered.

Regardless of which access mode is selected, a suitable video output signal is generated for representing a particular still picture. In order to display a single field recording, the second (interlace) field in the output signal can be a repeat of the stored field or, preferably, an interpolation from adjacent lines of the stored field. Moreover, the second (interlace) field in the output signal of a dual field recording can temporarily be a repeat, or interpolation, of the stored field until the actual second field is recovered. Because the video signal is coming from the frame store, maintenance of the dynamic head/disk interface that is the source of the video signals is optional. Therefore the disk drive may be stopped or the head removed from contact with the disk (or both). The frame store thus relieves head/disk wear without impairing the accessibility of the reproduced video signals.

BRIEF DESCRIPTION OF THE DRAWINGS

The invention will be described with reference to the drawings, in which.

DETAILED DESCRIPTION OF THE PREFERRED EMBODIMENT

Since video players are well known in which a video output signal is generated from picture signals recorded on a magnetic disk, the present description will be directed in particular to elements forming part of, or cooperating more directly with, the present invention. Player elements that are not specifically shown or described herein, especially circuits for implementing the functional blocks shown in FIG. 1, may be selected from those known in the art. While the invention is not restricted to a particular recording format, it is presumed for purposes of description that one field is recorded on each track and a full frame recording therefore occupies two adjacent tracks. In order to distinguish a single field from a full frame recording, a data signal is presumed to be recorded with each field on some unused part of its frequency spectrum, for example, by modulating the data on a suitably located subcarrier.

Figure 1:
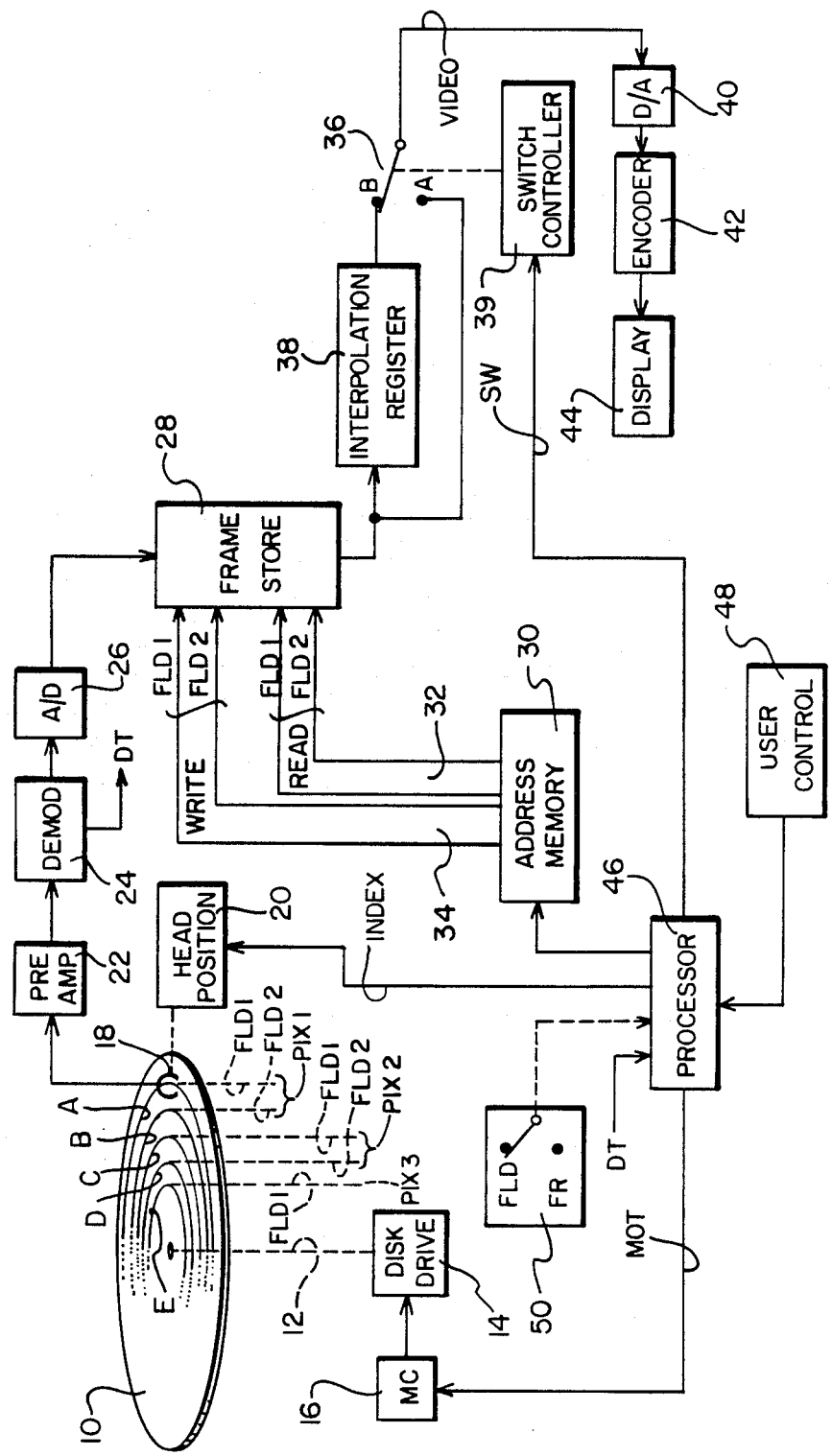
FIG. 1 is a block diagram of a video disk player incorporating a frame store for mixed field and frame recordings according to the invention.

Referring now to FIG. 1, a magnetic disk 10 is mounted for rotation upon a drive spindle 12 (shown by broken line) of a disk drive motor 14, which is energized by a motor control circuit 16. A sequence of circular magnetic tracks is located on a magnetic coating of the disk 10. Specifically, to illustrate mixed field and frame recording, tracks A and B contain two fields (FLD 1 and FLD 2) of a frame recording of a first picture (PIX 1). Tracks C and D contain two fields (FLD 1 and FLD 2) of a frame recording of a second picture (PIX 2). A single track E contains a single field (FLD 1) of a field recording of a third picture (PIX 3). Other field or frame recordings may be placed on the disk, up to a maximum usage of 50 tracks.

A magnetic playback head 18, shown overlying the magnetic track A, is deployed adjacent the disk 10 by connection to a head positioner 20. Playback is accomplished by thrusting the head 18 into contact with the magnetic track on the moving disk 10, thereby establishing a dynamic head/disk interface that provides the reproduced signals. By considering the reproduced signals to be a product of this dynamic interface, reproduction is interrupted by discontinuing the interface, that is, by lifting the head 18 from the disk surface, by deploying the head 18 off the edge of the disk 10, or by stopping the disk drive motor 14 (or some combination thereof).

The weak signal produced by the head 18 is applied to a preamplifier stage 22, where it is brought up to a suitable level for further processing. The amplified signal is applied to a demodulator 24, which separates the data signal DT from the recorded video signal and demodulates the video signal (which, in a typical recording format, is frequency modulated on a suitable carrier). The demodulated baseband video signal is converted into digital form by an analog-to-digital converter 26 and applied to a frame store 28. (the signal to the frame store 28 is shown as a unitary signal but, if the signal is a color signal, it could be separated into its demodulated luminance and chrominance components, which are separately stored in the frame store 28.) The frame store 28 is large enough to contain two complete fields of a video image. For a television picture requiring roughly 250,000 pixels (500 lines of 500 pixels), say with a pixel resolution of eight bits, the frame store 28 can be configured from eight conventionally-available 256K dynamic random access memories (DRAMs). More DRAMs, or larger DRAMs, will obviously provide greater frame store capacities. Read/write addresses are provided to the frame store 28 from an address memory 30. Separate read/write lines between the address memory 30 and the frame store 28 are shown for illustrative purposes, i.e., read lines 32 provide FLD 1 and FLD 2 read addresses and write lines 34 provide FLD 1 and FLD 2 write addresses.

The output signal from the frame store 28 is directed along separate circuit paths either to a contact A of a switch 36 or through an interpolation register 38 to a contact B of the switch 36. The switch 36 selects a combination of interpolated and recorded fields (by toggling between the contacts A and B) or a full frame sequence of recorded fields alone (by using the contact A). The operation of the switch 36 is determined by linkage to a switch controller 39. The interpolation register 38 generates an interlaced field either when a single field recording is being played back (as, for example, from the track E on the disk 10) or when the second field (e.g. from the tracks B or D) of a dual field recording has yet to be completely recovered and available from the frame store 28. In its simplest form the register 38 repeats the single recorded (or currently available) field with the half-line delay necessary for the interlaced field. Preferably, however, the register 38, in addition to providing the half-line delay, includes several registers for holding pixel data from at least two memory locations, for accumulating a sum of this pixel data, and for multiplying the sum (e.g. by ½) to obtain an average value. This procedure provides an interlace field having line values that are averages of the sums of adjacent lines of the recorded field.

The recovered video signal is converted back to analog form by a digital-to-analog converter 40 before being supplied to a video encoder 42. Since the format of the video signal on the disk 10 does not ordinarily comply with the usual format accepted by a television receiver, the encoder 42 includes suitable matrices, etc. for constructing, for example, an NTSC signal. The output of the encoder 42 is then connected to a conventional television display device 44.

A digital processor 46 provides the control signals to operate the player (as described in connection with FIGS. 2 and 3) according to its own conventional control routines and according to user instructions from a user control 48. Only the interconnections sufficient for an understanding of the invention are shown in FIG. 1. For instance, a motor control signal MOT supplied to the motor control circuit 16 determines when the disk drive motor 14 is on or off. A head positioning signal INDEX directs the head positioner 20 to move the head 18 from track to track. Meanwhile, the internal program of the processor 46 retains the identity of the track being accessed. A switching signal SW, applied to the switch controller 39, determines the position of the switch 36. Control lines also connect to the address memory 30 and from the user control 48. The data signal DT, providing field or frame identity, is supplied to the processor for use in generating control signals appropriate for the type of recording.

Figure 2:
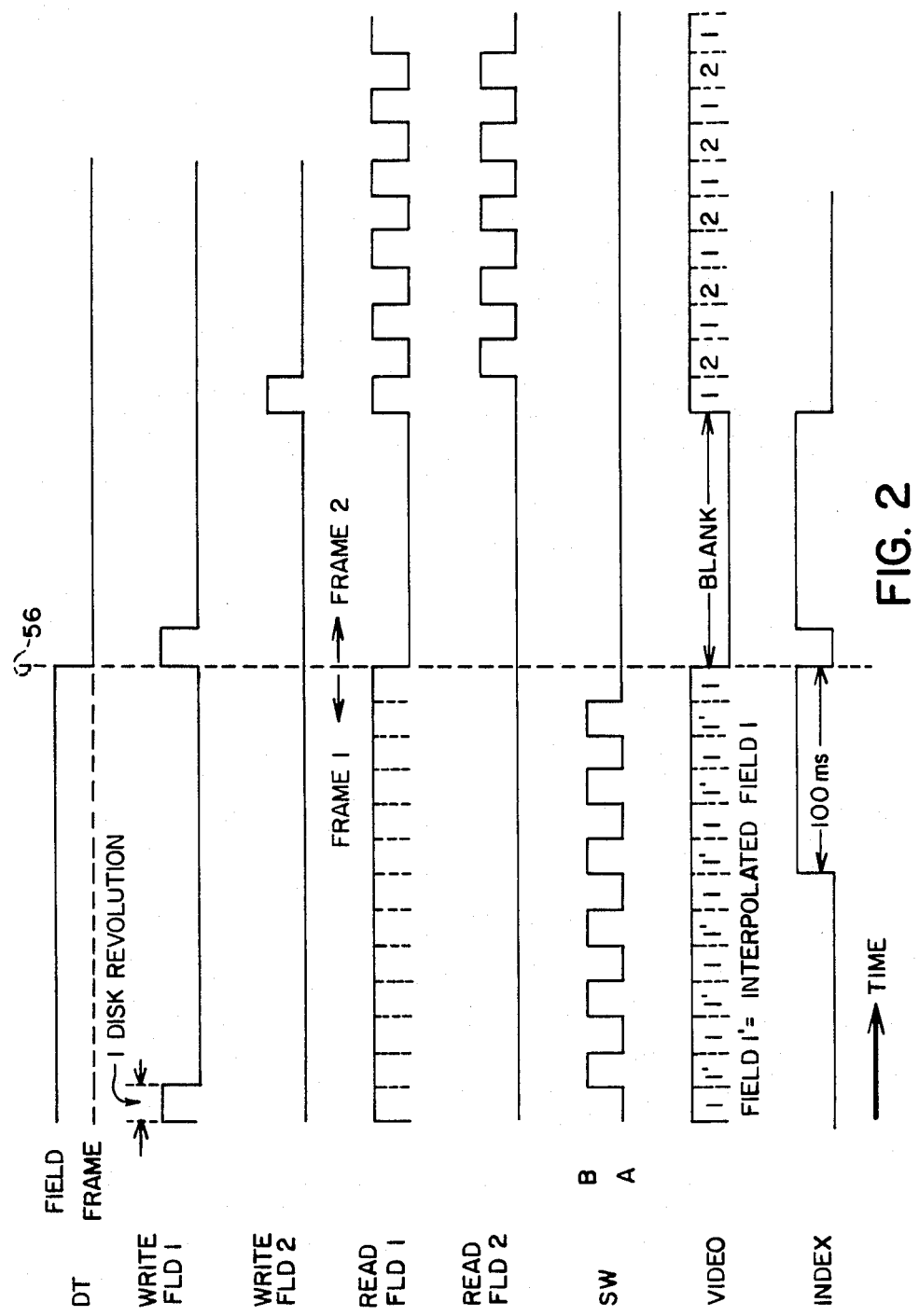
FIG. 2 is a set of waveform diagrams showing various signals useful in adapting the player of FIG. 1 to mixed field and frame recordings.

FIG. 2 illustrates the operations involved in displaying mixed single field and full frame recordings. The data signal DT from the demodulator 24 is shown high for a single field recording and low for a full frame recording. The generation and communication of writing addresses for the two fields is shown as the high condition for the two waveforms WRITE FLD 1 and WRITE FLD 2. That is, during the period of a single disk revolution the write addresses are applied to the frame store 28 for entering video signals from the A/D converter 26 into locations of the frame store 28. The generation and communication of read addresses is similarly shown (READ FLD 1 and READ FLD 2) except that, reading being a continuous operation from the frame store 28, the appropriate read addresses are repeatedly provided. The switching signal SW is applied to the switch controller 39 and closes the output line to contact B when the signal SW is high and to contact A when the signal SW is low. It is important to note that FIG. 2 is divided into two sections by the broken line 56. To the left of this line there is shown the reproduction of an interpolated frame from a single field recording; to the right a full frame from two field recordings.

Starting to the left of the line 56, a field signal is written into the frame store 28 during one disk revolution (WRITE FLD 1 high) and then repeatedly read from the frame store 28 (READ FLD 1 high). In the preferred embodiment an interlace field is interpolated from the readout signal by the interpolation register 38. The desired alternation of stored and interlaced fields is obtained by the alternating waveform of the switching signal SW. The output video signal VIDEO is seen to be an alternating sequence of stored fields 1 and interlaced fields 1'.

At some point during the display of the interpolated frame from the single field signal, an instruction comes from the user control 48 to go to the next picture (or any desired picture) on the disk 10. The processor 46 initiates a positioning signal INDEX which goes high for the period necessary to find the next track. According to the preferred embodiment, the head 18 is moved at less than video rates. (FIG. 2 shows a period of 100 milliseconds, or approximately six times the field rate, to move to an adjacent track). Once the head is positioned at the next track (i.e. to the right of the line 56), the data signal DT is found to be low—indicating the presence of a full frame recorded signal. The first field is then written into the frame store 28 (WRITE FLD 1 is held high for one disk revolution), the head 18 is indexed to the next track (INDEX is held high for 100 ms), and the second field is written into the frame store 28 (WRITE FLD 2 is held high for one disk revolution). Then the video signal is continuously taken through the contact A of the switch 36 (SW is low) by alternately providing read addresses to field 1 and field 2 (READ FLD 1 and READ FLD 2 are alternately set high and low). The output signal VIDEO is an alternating sequence of stored fields 1 and 2.

Figure 3:
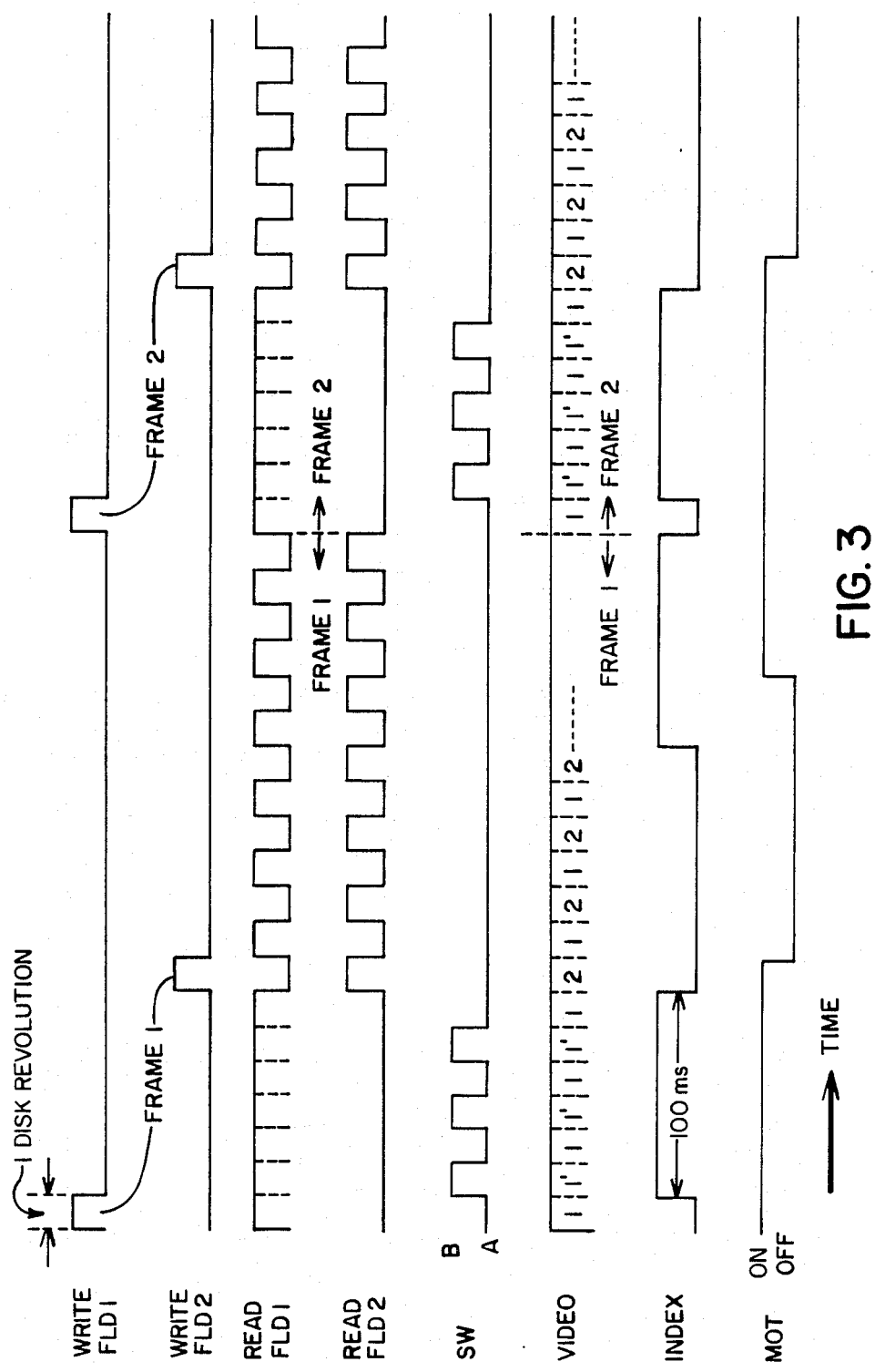
FIG. 3 is a further set of waveform diagrams showing further signals useful in the player of FIG. 1 for implementing additional features involving the frame store.

FIG. 3 illustrates two improvements over the invention as practiced by the procedure outlined in FIG. 2. The invention as practiced according to FIG. 2 does provide the benefit of producing, and displaying, the output signal VIDEO while the head is indexing to the next selected picture. There is, however, a blank period in the output signal VIDEO in FIG. 2 while the player is recovering the full frame for the next selected picture. According to the practice outlined by FIG. 3, a "temporary" output signal is provided as soon as the first field of a frame is recovered (the first time WRITE FLD 1 goes high). During the period (100 ms) of head movement to the second track the first field is repeatedly accessed (READ FLD 1 is high) and an interpolated interlace field is provided at the output of the switch 36 (SW alternately high and low for alternating stored and interpolated fields). Once the second field is available from the frame store 28, an alternating sequence of the stored first and second fields is substituted for the temporary output signal (READ FLD 1 and READ FLD 2 alternately high and low).

A second improvement shown by FIG. 3 is that a signal MOT is applied to the motor control circuit 16 for shutting off the disk drive motor 14 once the head 18 has recovered the second field signal. This has the advantageous benefit of prolonging the life expectancy of the disk 10 and the playback head 18. The signal MOT is set high (turning the motor 14 on) sometime coincident with or after the instruction is received from the user control 48. When the motor 14 is locked at correct speed (e.g., 3600 r.p.m.) the head 18 can recover the first field signal from the next selected picture on the disk 10.

Commonly assigned, copending patent application Ser. No. 644,096, entitled "Video Disk Apparatus Providing Organized Picture Playback," and filed Aug. 24, 1984, discloses a video player capable of accessing each of a plurality of disks (each within a cartridge) contained in a magazine. A shuttle transport is disclosed for removing cartridges from the magazine and engaging them with a disk drive for playback of pictures. The selection of the next picture may entail moving the playback head to another track on the same disk, or perhaps to a track on a disk in another cartridge. The latter selection requires the shuttle to return the cartridge presently in the disk drive to the magazine and remove another cartridge from the magazine. Finding the next cartridge also involves moving the magazine relative to the shuttle and the disk drive. All this means that there can be a considerable period of time (3-4 seconds) while the player is seeking the next picture. The present invention offers the attractive feature of being able to playback the current picture all the while until the next cartridge is in place in the disk drive and ready to provide the next selected picture. This virtually eliminates the necessity of blanking the display screen while the player is going through the mechanical motions of seeking the next cartridge.

Since the proposed recording format allows a random grouping of full frame and single field signals on the same magnetic disk, it is necessary to provide the data signal DT to the processor 46 for indicating which set of operations is to be performed on the recovered signals. In practice, however, it is likely that a disk will often be devoted entirely to either full frame (25 pictures) or single field (50 pictures) recordings. Therefore a user-operated switch 50 (see FIG. 1) can be provided in lieu of the data signal DT for keying the processor 46 to the correct set of operations. Knowing what type of recordings are on the disk, the user will accordingly position the switch 50.

The invention has been described in detail with particular reference to a presently preferred embodiment, but it will be understood that variations and modifications can be effected within the spirit and scope of the invention.

What is claimed is:

1. A video player for generating a video output signal pertaining to a sequence of still pictures from signals recorded on magnetic tracks on a magnetic disk, said recorded signals including separate picture field signals representing particular still pictures composed of either a single field or a pair of fields, said player comprising:

a magnetic playback head;
   means for establishing a dynamic head/disk interface capable of reproducing said recorded signals;
   means for indexing said playback head from track to track thereby to produce a sequence of picture field signals;
   means for storing one or more of said field signals comprising a particular still picture such that the one or more field signals are readily accessible at video rates;
   means responsive to the storage of said one or more picture field signals for disabling said establishing means and interrupting said head/disk interface;
   access means for recovering said stored picture field signals according to either of two access modes: a first mode in which a single picture field signal is repeatedly recovered and a second mode in which two field signals pertaining to the same still picture are alternately recovered;
   means for selecting one of the access modes; and means responsive to said selected access mode for generating a video output signal representative of a particular still picture.

2. A player as claimed in claim 1 in which said means responsive to said selected access mode comprises means responsive to said first access mode for repeating each accessed field signal twice to generate two fields pertaining to the same still picture.

3. A player as claimed in claim 1 in which each field signal comprises a plurality of line signals and in which said means responsive to the selected access mode comprises means responsive to said access means when in its first access mode for interpolating adjacent line signals to generate a second field signal pertaining to the same still picture.

4. A player as claimed in claim 3 in which said means for interpolating comprises means for averaging adjacent line signals.

5. A player as claimed in claim 1 in which said recorded signals include a data signal indicating whether a particular still picture is composed of a single field or a pair of fields, and said means for selecting one of the access modes is responsive to said data signal.

6. A video player for generating a video output signal pertaining to a video still picture from signals recorded on a magnetic disk, said recorded signals being derived from individual video fields that each correspond to a separate circular track on the magnetic disk, said player comprising:
   a magnetic playback head;
   means for establishing a dynamic interface between said playback head and the disk capable of reproducing the recorded signals;
   means for indexing said playback head between two tracks thereby to produce a pair of field signals representative of a video frame recorded on the disk;
   means for sequentially storing said pair of field signals as they are recovered from the disk such that said field signals are readily accessible at a video line rate;
   means for accessing said stored field signals according to either of two access modes: a first access mode in which the first field signal to be recovered is repeatedly accessed and a second access mode in which both field signals are alternately accessed, said accessing means selecting the first access mode until said second field signal is available from said storing means and the second access mode after both field signals are available from said storing means; and
   means for generating a video output signal from the accessed field signals whether in said first or second access modes.

7. A player as claimed in claim 6 further including means for interrupting the dynamic interface between said playback head and the disk after the second field signal is recovered from the disk.

8. A player as claimed in claim 6 in which said means for generating a video output signal in said first access mode comprises means for interpolating a temporary interlace field signal pertaining to the same video still picture.

9. A video player for generating a still video output signal from signals recorded on a magnetic disk, the still video output signal being generated according to user-initiated instructions designating particular still video pictures for display, said player comprising:
   track interface means for sequentially reproducing a first field signal from a first magnetic track and a second field signal from a second magnetic track adjacent said first track, said track interface means comprising a magnetic playback head for reproducing the recorded signals, a drive mechanism for rotating the magnetic disk at a video field rate, and means for indexing said playback head between said first and second tracks at less than a video line rate;
   frame storing means for storing said first and second field signals such that said signals are accessible at video line rates;
   means for generating a still video output signal from said stored field signals, said generating means comprising means for generating the still video output signal from the first field signal as soon as it is available from said frame storing means and from both field signals, after said playback head has been indexed to said second track, as soon as the second field signal has been reproduced and both field signals are available from said frame storing means; and
   means for controlling the operation of said track interface means, said controlling means comprising means responsive to the availability of said first and second stored field signals for disabling said track interface means and to a user-initiated instruction for activating said track interface means prior to recovering the next-designated picture.

10. A player as claimed in claim 9 in which said means for disabling said track interface means comprises means for deenergizing said drive mechanism so as to stop relative movement between said playback head and the disk.

* * * * *